(12) United States Patent
Heumann

(10) Patent No.: US 6,837,912 B1
(45) Date of Patent: Jan. 4, 2005

(54) CYCLONE SEPARATOR WITH SURFACE VANES

(75) Inventor: William L. Heumann, Prospect, KY (US)

(73) Assignee: Fisher-Klosterman, Inc., Louisville, KY (US)

( * ) Notice: Subject to any disclaimer, the term of this patent is extended or adjusted under 35 U.S.C. 154(b) by 110 days.

(21) Appl. No.: 10/405,171

(22) Filed: Apr. 2, 2003

Related U.S. Application Data
(60) Provisional application No. 60/374,595, filed on Apr. 22, 2002.

(51) Int. Cl.[7] .............................................. B01D 45/12
(52) U.S. Cl. ...................................... 55/424; 55/459.1
(58) Field of Search ....................... 55/413, 424, 426, 55/427, 459.1, 465; 239/402.5

(56) References Cited

U.S. PATENT DOCUMENTS

| | | | |
|---|---|---|---|
| 432,491 A | | 7/1890 | Kutsche |
| 1,055,792 A | | 3/1913 | Plock |
| 1,444,384 A | * | 2/1923 | Friedrich .................... 55/385.3 |
| 1,982,733 A | | 12/1934 | Forster |
| 2,010,128 A | | 8/1935 | Arnold |
| 2,222,930 A | | 11/1940 | Arnold |
| 3,396,513 A | | 8/1968 | Humphreys |
| 3,513,642 A | | 5/1970 | Cornett |
| 3,618,302 A | | 11/1971 | Cornett |
| 3,951,620 A | | 4/1976 | Frischmuth, Jr. |
| 4,229,194 A | | 10/1980 | Baillie |
| 5,358,637 A | * | 10/1994 | Hutzler et al. .............. 210/415 |

* cited by examiner

Primary Examiner—Robert A. Hopkins
(74) Attorney, Agent, or Firm—Camoriano and Associates; Theresa Fritz Camoriano; Guillermo Camoriano

(57) ABSTRACT

A cyclone separator including vanes along the inside wall of the conical section of the separator to regulate the pitch and thus the axial velocity of the gas flow stream in the separator. By adjusting the pitch of the gas flow stream, the collection efficiency of the separator can be optimized so as to minimize the amount of dust particles which are re-entrained in the gas flow stream exiting the separator.

15 Claims, 5 Drawing Sheets

CYCLONE SEPARATOR WITH SURFACE VANES

BACKGROUND OF THE INVENTION

This application claims priority from U.S. Provisional Application Ser. No. 60/374,595 filed on Apr. 22, 2002, which is hereby incorporated by reference.

The present invention relates to a cyclone separator. More particularly, it relates to a cyclone separator which includes adjustable vanes along the inside surface of the cone of the cyclone separator. These vanes are adjusted in order to direct the gas flow so as to optimize the separation of particulates from the gas flow.

Cyclone separators are often used as primary gas pollution control equipment, ahead of baghouses, for instance, to knock out the larger particles and reduce the particulate loading on the baghouse. It is desirable to optimize the performance of the cyclone separator by minimizing the emission of particulates from the cyclone separator so as to minimize the discharge of particulates into the environment, or to reduce the loading on downstream equipment such as baghouses.

Current design practices do not optimize the combination of axial and tangential velocities of the gas flow in the cyclone separator. This results in a stagnation level in some cyclone cones, and in excessive re-entrainment of the dust particles back into the effluent gas flow stream in other cases.

SUMMARY OF THE INVENTION

The present invention provides vanes in the inside conical wall of the cyclone separator in order to control the axial velocity of the gas flow stream in the cyclone separator. In a preferred embodiment, the angle of the vanes is adjustable. Thus, if the pitch of the gas flow into the cyclone is too steep and the axial flow is too high, the vanes may be adjusted to a shallow angle to flatten the pitch and reduce the axial flow rate. On the other hand, if the pitch of the gas flow is too shallow and the axial flow is too low, the vanes may be adjusted to a more pronounced angle to increase the pitch angle and increase the axial flow rate.

In a preferred embodiment, the surface vanes are readily adjustable from the outside of the cyclone separator body so that tests can be performed measuring deposition rates against vane position in order to empirically determine the optimum setting of the vanes for any given gas flow rate, particulate loading, and particle size distribution.

In yet another embodiment, the cyclone may have more than one set of vanes at a given elevation of the cyclone, and the angle setting of each set of vanes may be set independently of the angle setting of any other set of vanes.

DESCRIPTION OF THE PREFERRED EMBODIMENT

Figures 1, 2:
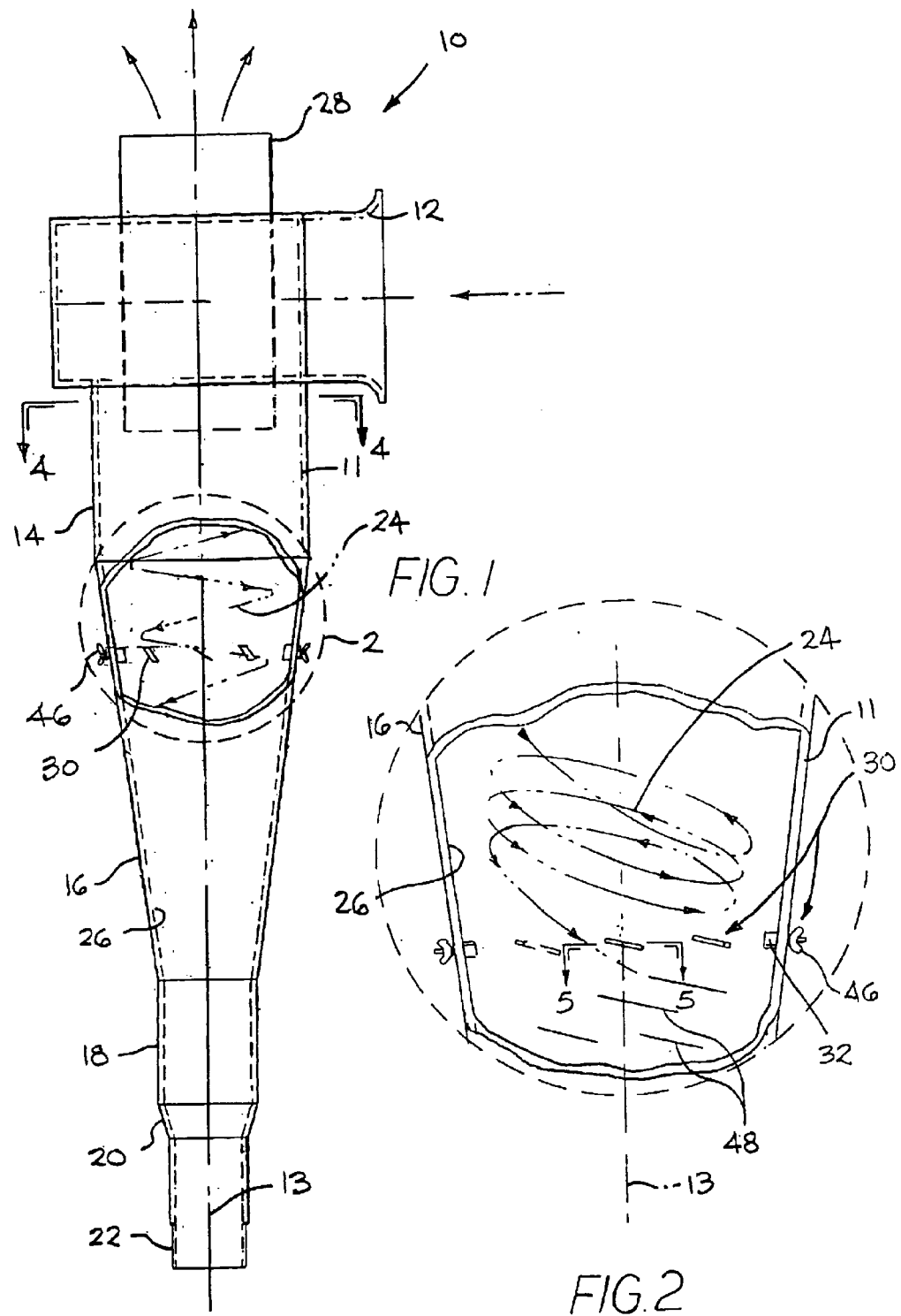
FIG. 1 is a side view, partially broken away, of a cyclone separator with vanes made in accordance with the present invention.
FIG. 2 is an enlarged view of the broken-away section of FIG. 1, showing the vanes adjusted at a shallow angle so as to reduce the pitch of the gas flow stream.

FIG. 1 shows a cyclone separator 10 made in accordance with the present invention. The cyclone separator 10 has a continuous side wall 11, which has a circular cross-section and defines a central vertical axis 13. The side wall 11 defines a tangential inlet 12 to allow a particulate laden gas, such as air, to enter the body of the cyclone separator 10. The side wall 11 of the cyclone separator 10 includes an upper cylindrical section 14, connected to an intermediate frustro-conical section 16 (hereinafter referred to simply as the conical section 16), followed by a lower cylindrical section 18. A cylindrical, solids outlet section 22 is connected to the lower cylindrical section 18 via a concentric reducer 20. A cylindrical, clean-gas-outlet section 28 is located at the top of the cyclone separator 10, and this outlet section 28 extends a distance into the body of the cyclone separator 10 as shown in FIG. 1. Typically, particulate laden gas is drawn into and through the cyclone separator 10 by a fan (not shown) located downstream of the cyclone separator 10 and connected to the outlet section 28.

As the gas enters the cyclone separator 10, the tangential inlet section 12 induces a swirling action to the gas. As more gas enters the cyclone separator 10, it displaces the gas already in the cyclone separator 10, causing it to move downwardly along the inside surface 26 of the side wall 11 of the conical section 16. This creates a downwardly spiraling vortex 24. As the cross-sectional area of the conical section 16 decreases, the velocity of the gas flow increases, and the centrifugal forces acting on the dust particles carried by the gas flow force these particles against the inside surface 26 of the conical section 16. These dust particles are carried down along the inside surface 26 and, in a properly sized and designed cyclone separator 10, these dust particles are deposited into the cylindrical section 18 to be evacuated via the solids outlet section 22, while the gas flow makes a sharp change in direction to flow up along the central axis 13 of the cyclone separator 10 and out the outlet section 28.

Only those particles which are heavy enough for the centrifugal force acting on them to overcome the force of the gas flow are likely to be removed in the cyclone separator 10. If the downwardly spiraling vortex 24 is too steep, the gas flow tends to pick up dust particles which have been deposited in the lower cylindrical section 18, causing these particles to become re-entrained and carried away to the gas outlet section 28, thereby decreasing the deposition efficiency of the cyclone separator 10. On the other hand, if the downwardly spiraling vortex 24 is too shallow, the gas flow tends to stall, which causes the dust particles to stall in some portion of the cone, allowing the gas flow stream to carry some of the dust particles away to the gas outlet section 28 before they are collected, once again decreasing the deposition efficiency of the cyclone separator 10. This condition, also known as roping, not only causes losses in collection efficiency; it also causes undue erosion in the inside surface 26 of the side wall 11 of the conical section 16.

Thus, it is important to find and establish the optimum axial velocity of the gas flow stream to assist in sending the "centrifuged" dust particles to the solids outlet section 22. The optimum axial velocity will establish the right balance between too much axial velocity (which has the gas stream once again picking up the settled dust particles) and not enough axial velocity (which causes the dust particles to stall in some portion of the cone, allowing the gas flow stream to carry the dust particles away before they settle down).

FIG. 2 shows that, if the pitch of the vortex 24 is too steep (the axial velocity of the gas flow stream is too high), the vanes 30 may be adjusted to a shallow angle, which flattens the pitch of the gas flow (as shown schematically by the lines 48 representing the new pitch of the gas flow stream after correction by the vanes 30). At this flatter pitch, the gas flow stream is less likely to re-entrain the settled dust particles in the lower cylindrical section 18, thus optimizing the collection efficiency of the cyclone separator 10.

Figure 3:
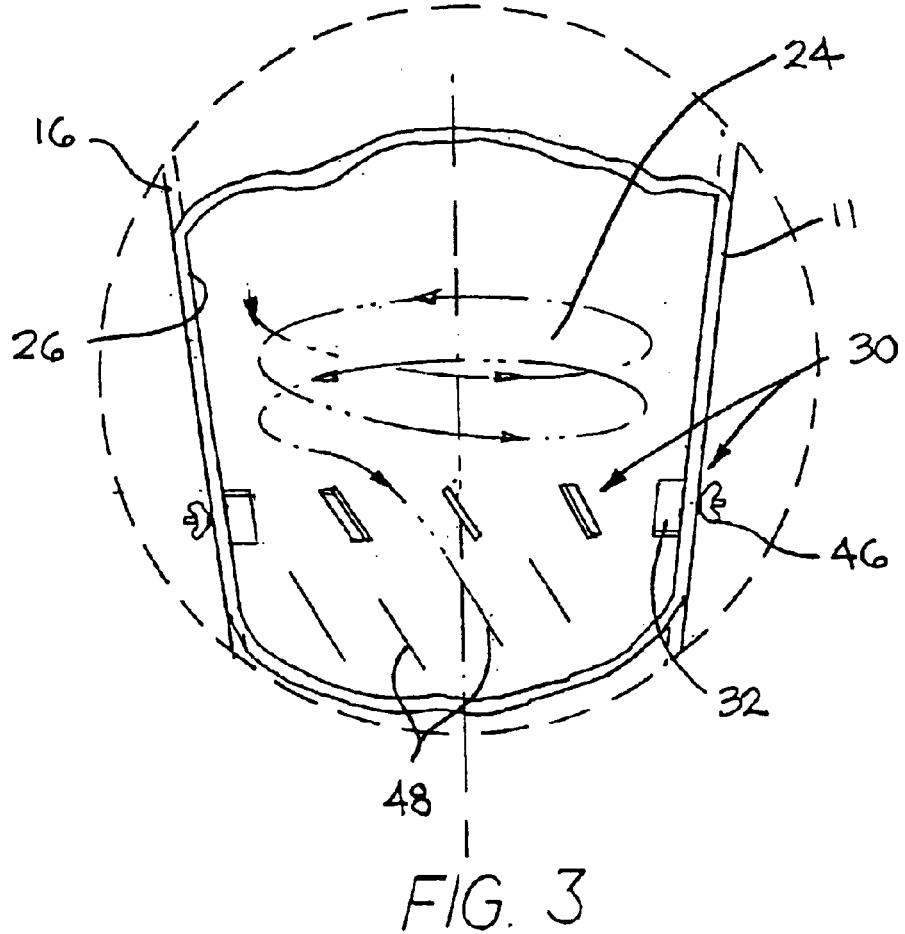
FIG. 3 is the same as FIG. 2 except the vanes are adjusted to a steeper angle so as to increase the pitch of the gas flow stream.

FIG. 3 shows that, if the pitch of the vortex 24 is too shallow (the axial velocity of the gas flow stream is too low), the vanes 30 may be adjusted to a steep angle, which increases the pitch of the gas flow (as shown schematically by the lines 48 representing the new pitch of the gas flow stream after correction by the vanes 30). At this steeper pitch, the gas flow stream is less likely to stall the dust particles as they move downwardly along the inside surface 26 of the side wall 11 of the conical section 16. The dust particles are conveyed and collected in the lower cylindrical section 18 instead of being carried away to the outlet 28, thus optimizing the collection efficiency of the cyclone separator 10.

On site tests at different particulate size distributions, different particulate loading, and different pressure drops across the cyclone separator 10 will establish the pitch angle of the vanes 30 which maximizes collection efficiency for differing operational parameters.

Figure 4:
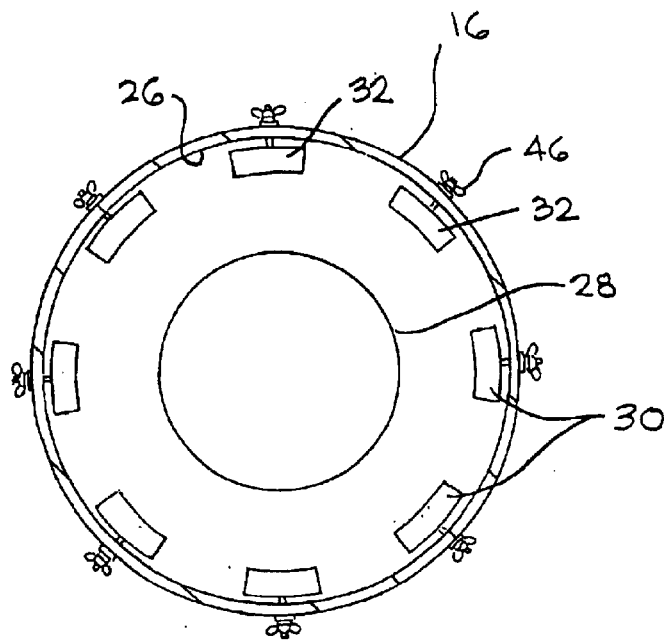
FIG. 4 is a section view taken along line 4—4 of FIG. 1, showing the vanes.
Figure 5:
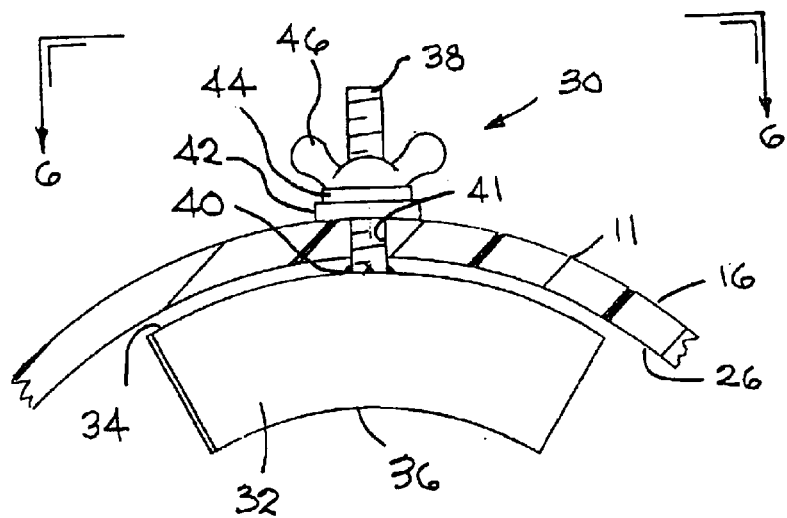
FIG. 5 is an enlarged view of one of the vanes of FIG. 4.

FIGS. 4 and 5 show the vane assemblies 30 used in the present invention to alter the gas flow stream so as to increase or reduce the axial velocity of the gas steam as required to optimize the collection efficiency of the cyclone separator 10. Referring to FIG. 5, the vane assembly 30 comprises an arcuately-shaped flat plate 32 which, in this preferred embodiment, is made from steel. The plate 32 has an outer edge 34 with a radius which closely matches the radius of the cross-section of the conical section 16 at the location where the plate 32 is installed. The inner edge 36 of the plate 32 generally matches the shape of the outer edge 34. Toward the middle of the arcuate segment formed by the outer edge 34, one end 40 of a threaded rod 38 is attached (preferably by brazing or welding) to the plate 32. A hole 41 through the side wall 11 of the conical section 16 allows the threaded rod 38 to extend from the inside of the cyclone separator 10 to the outside. A rubber washer 42, a metal washer 44, and a wing nut 46, in that order, are threaded onto the rod 38 to secure the plate 32 to the inside of the cyclone separator 10. The pitch of the vane assembly 30 may be readily adjusted from the outside of the cyclone separator 10 by loosening the wing nut 46, turning the rod 38 until the plate 32 is at the desired angle, and then re-tightening the wing nut 46 to keep the vane assembly 30 in this new position. As the wing nut 46 is tightened, the rubber washer 42 is compressed against the outside wall of the conical section 16 of the cyclone separator 10, pulling the outer edge 34 of the plate 32 against the inside surface 26 of the wall 11 of the conical section 16 and holding it in place.

Figure 6:
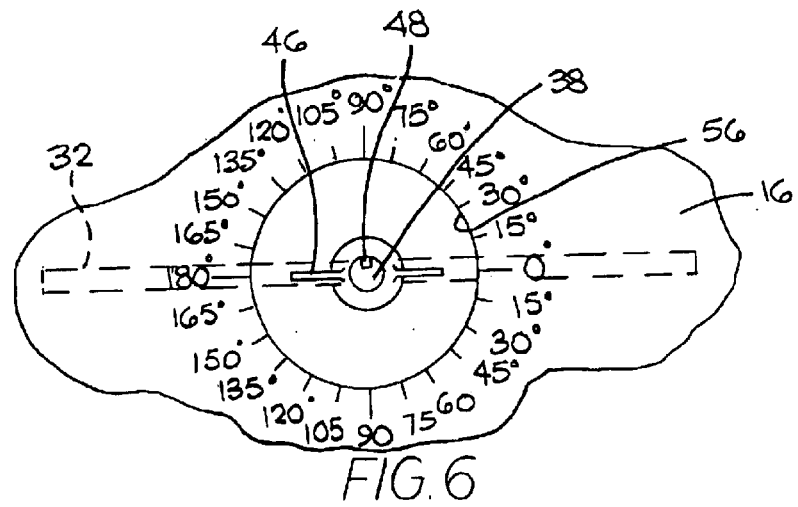
FIG. 6 is a broken away view along line 6—6 of FIG. 5.
Figure 7:
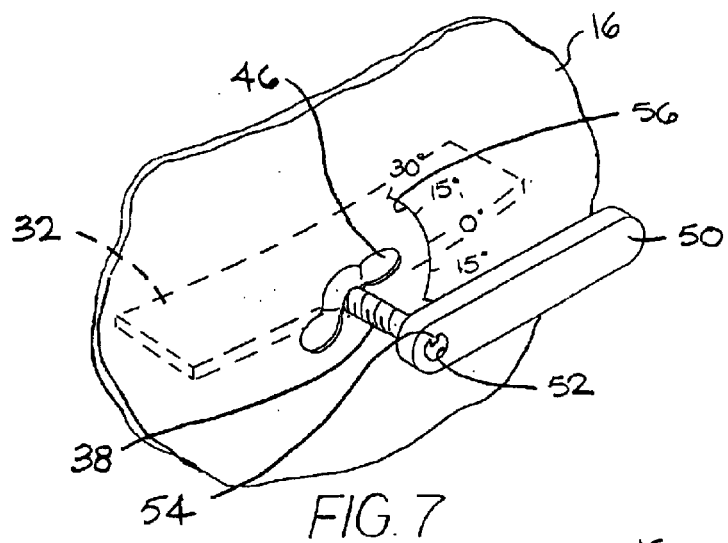
FIG. 7 is a perspective view of the portion of the cyclone shown in FIG. 6, but also including a lever arm for adjusting the vane.
Figure 8:
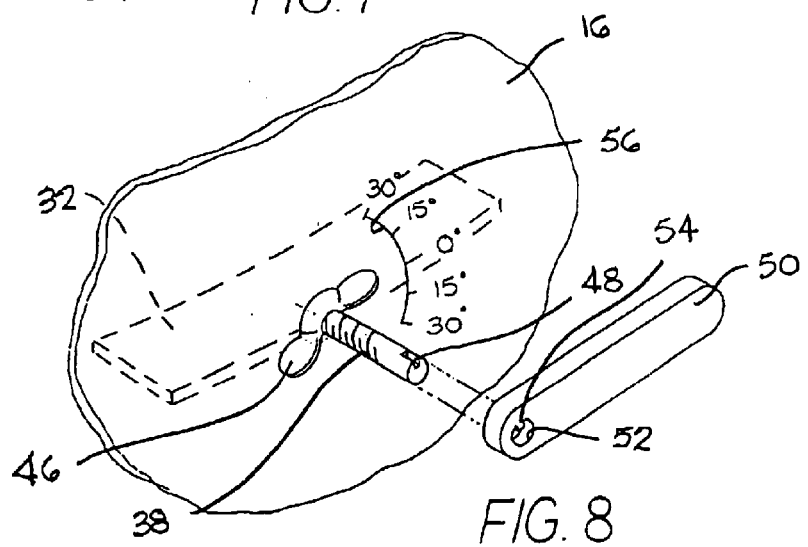
FIG. 8 is the same view as FIG. 7 but partially exploded.

FIGS. 6, 7, and 8 show one embodiment of a mechanism for turning the rod 38 to adjust the plate 32. The threaded rod 38, which is secured to the plate 32 at one end 40, has a slotted keyway 48 at its opposite end. A lever arm 50 has a hole 52 and a projection 54 within the hole 52. The threaded rod 38 extends through the hole 52 (as seen in FIG. 7), and the projection 54 slides into the slotted key way 48 in such a way that the longitudinal dimension of the arm 50 is parallel to the longitudinal dimension of the plate 32 inside the separator 10. In order to adjust the position of the plate 32, the wing nut 46 is loosened; the arm 50, installed over the threaded rod 38, is moved to the desired angle, and the plate 32 follows the movement of the arm 50. Once at the desired angle, the wing nut 46 is tightened and the arm 50 may be removed, or it may be left in place to give a visual indication of the angular setting of the plate 32 inside the cyclone 10. The dial face 56 with graduations in degrees is provided on the outer surface of the wall 11 surrounding the rod 38 as a reference to assist the user in setting all the vane assemblies 30 to the desired angular setting.

Figure 9:
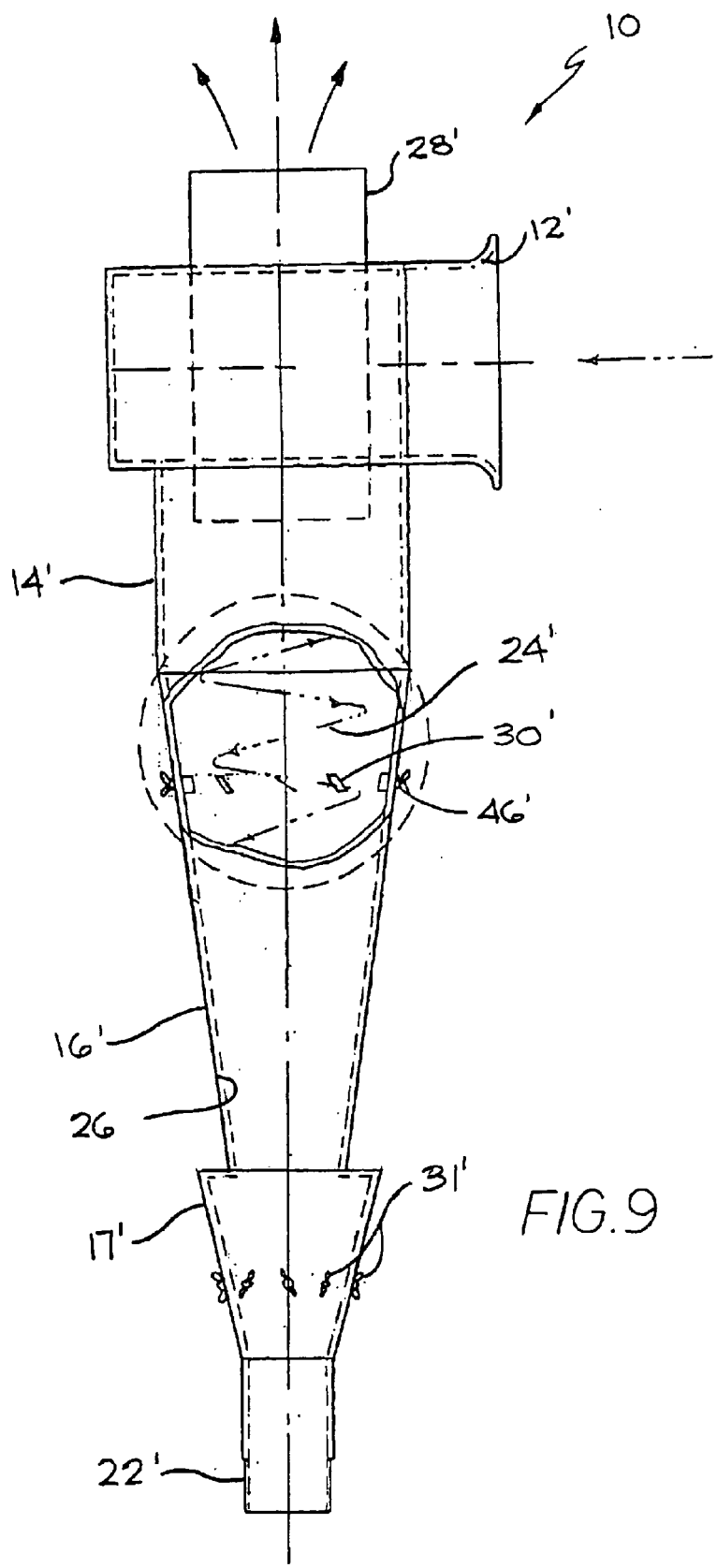
FIG. 9 is a side view, partially broken away, of another embodiment of a cyclone separator with vanes made in accordance with the present invention, depicting two sets of vanes.

FIGS. 1, 2 and 3 show a plurality of spaced-apart plates 32 mounted at evenly spaced angular positions at one level (or height) around the conical section 16. In this particular embodiment there are eight vane assemblies 30. However, as shown in FIG. 9, two or more levels of vane assemblies 30 could be used within a single cyclone separator 10, and the vane assemblies 30 at a first axial level may be set at a different pitch than the vane assemblies 30 at a second axial level to progressively affect the pitch of the gas flow stream. In a preferred embodiment (not shown), there are four vanes at a first elevation and four vanes at a second elevation.

Empirical testing has established that a single level location of the vane assemblies 30 has been effective in reducing emissions by between 14% and 70%, and it is preferred to provide vanes at two different levels or elevations. The angle of the vane plates 32 relative to the horizontal may be adjusted from zero degrees to 180 degrees. It is preferred that the angle be between plus or minus twenty (20) degrees from the horizontal and most preferable that the angle be between minus five (−5) and plus five (+5) degrees from the horizontal, whether one or two sets of vanes are present, as described later.

The axial elevation of the vane assemblies 30 along the wall 11 of the conical section 16 of the cyclone 10 may vary. It may be that the most effective location for the vane assemblies 30 would be to place them within the lowermost 20% to 30% of the vertical height of the conical section 16. If a second set of vanes is installed, it may be that the most effective location for this second set of vane assemblies 30 would be to place them within the lowermost 20% to 50% of the vertical height of the conical section 17', as described later.

The number of vane assemblies 30 may vary depending on the size of the cyclone separator 10, and particularly depending on the diameter of the conical section 16 at the height at which the vane assemblies 30 are installed. FIG. 4 shows a preferred configuration of eight (8) vanes 30 evenly distributed around the circumference of the conical section 16, with each vane 30 extending through an arcuate segment of approximately 22.5 degrees, for a total of 180 degrees, or half of the circumference, occupied by the vanes. It is preferred that any elevation of vanes occupies no more than 270 degrees or three-fourths of the circumference, with the remaining one-fourth or more being spaces between the vanes. This 22.5 degree arc length dimension represents the length of the vane plate 32. The width of the vane plate 32 is the radial distance between the outer edge 34 and the inner edge 36, and this width typically is approximately 10% of the diameter of the cyclone at the axial elevation of the vane, which, for a cyclone having a diameter of 10 inches, would be one inch.

It is most helpful to change the pitch of the gas flow stream close to the inside surface 26 of the wall of the conical section 16, as this is the stream which is likely to stall or to re-entrain the dust particles which have been "centrifuged" and are thus being carried downwardly along the inside surface 26 of the wall of the conical section 16.

FIG. 9 depicts another embodiment of a cyclone made in accordance with the present invention. This cyclone 10' is very similar to the cyclone 10 of the first embodiment, except that this cyclone 10' incorporates a second set of vanes 31' in a second conical section 17' of the cyclone 10'. This second set of vanes 31' may be oriented at any desired angle, which need not be the same angle at which the first set of vanes 30' are set. It has been determined that this second set of vanes 31' is preferably located from 20% to 50% up the axial height of the second conical section 17'. The angle of the vanes 31' from the horizontal may be adjusted from zero degrees to 180 degrees, but it is preferred that the angles be between plus and minus 20 degrees and most preferably between plus and minus 5 degrees from the horizontal.

While the embodiment described above shows a simple means for adjusting the angle of the vanes, various other mounting mechanisms could be used to adjust and control the angular position of the vane assemblies 32. It will be obvious to those skilled in the art that modifications may be made to the embodiments described above without departing from the scope of the present invention.

What is claimed is:

1. A cyclone separator, comprising;
   a cyclone wall having a substantially circular cross-section, defining a vertical axis, having an inside surface and an outside surface, and defining an inlet, said cyclone wall including a first frustroconical section in fluid communication with said inlet; and
   at least one vane defining a longitudinal dimension, wherein said vane is mounted adjacent to the inside surface of said first frustroconical section, and
   means for adjusting the angle of said vane from the outside of said cyclone wall.

2. A cyclone separator as recited in claim 1, wherein said means for adjusting the angle of said vane comprises a shaft attached to said vane, said shaft pivotably extending through said cyclone wall from said inner surface to said outer surface, such that rotation of said shaft also results in rotation of said vane for adjusting said angle of said vane.

3. A cyclone separator as recited in claim 2, and further comprising an arm defining a longitudinal dimension, said arm being connected to said shaft and lying outside of said cyclone wall, wherein rotation of said arm results in rotation of said shaft.

4. A cyclone separator as recited in claim 3, wherein said longitudinal dimension of said arm is aligned with said longitudinal dimension of said vane, such that the position of said arm indicates the position of said vane inside said cyclone.

5. A cyclone separator as recited in claim 3, wherein said cyclone wall further comprises:
   a second frustroconical section in fluid communication with said inlet; and
   at least a second vane defining a longitudinal dimension, wherein said second vane is mounted adjacent to the inside surface of said second frustroconical section; and including means for adjusting the angle of said second vane from the outside of cyclone wall.

6. A cyclone separator as recited in claim 1, wherein said angle of said vane is in the range of plus five to minus five degrees from the horizontal.

7. A cyclone separator as recited in claim 5, wherein said angle of said vane is in the range of plus five to minus five degrees from the horizontal, and said angle of said second vane is in the range of plus five to minus five degrees from the horizontal.

8. A cyclone separator as recited in claim 4, and further comprising an angle indicator secured to one of said outside surface of cyclone wall and said shaft, wherein said angle indicator is located outside said cyclone wall.

9. A cyclone separator, comprising;
   a cyclone wall having a substantially circular cross-section, defining a vertical axis, having an inside surface and an outside surface, and defining an inlet, said cyclone wall including a first frustroconical section in fluid communication with said inlet; and
   at least one vane defining a longitudinal dimension, wherein said vane is mounted adjacent to the inside surface of said first frustroconical section;
   a shaft mounted on said vane and projecting through an opening in said cyclone wall; and
   an indicator outside said cyclone indicating the angular position of said vane.

10. A cyclone separator, comprising;
    a cyclone wall having a substantially circular cross-section, defining a vertical axis, having an inside surface and an outside surface, and defining an inlet, said cyclone wall including a first frustroconical section in fluid communication with said inlet; and
    a first plurality of spaced-apart vanes mounted adjacent to the inside surface of said first frustroconical section at a first elevation, said vanes lying at an angle within twenty degrees of the horizontal.

11. A cyclone separator as recited in claim 10, and further comprising a second plurality of spaced apart vanes mounted adjacent to the inside surface of said first frustroconical section at a second elevation, said second vanes also lying at an angle within twenty degrees of the horizontal.

12. A cyclone separator as recited in claim 10, wherein said vanes lie within the lower half of said first frustroconical section.

13. A cyclone separator as recited in claim 11, wherein said first and second plurality of vanes lie within the lower half of said first frustroconical section.

14. A cyclone separator as recited in claim 10, wherein said first plurality of vanes occupies less than three-fourths of the circumference of said first frustroconical section.

15. A cyclone separator as recited in claim 13, wherein said first plurality of vanes occupies less than three-fourths of the circumference of said first frustroconical section, and said second plurality of vanes occupies less than three-fourths of the circumference of said first frustroconical section.

* * * * *